United States Patent
Bosnjak

(10) Patent No.: US 9,670,970 B2
(45) Date of Patent: Jun. 6, 2017

(54) TRANSPORT LOCK, IN PARTICULAR FOR THE PISTON OF A CLUTCH RELEASE BEARING

(71) Applicant: Schaeffler Technologies GmbH & Co. KG, Herzogenaurach (DE)

(72) Inventor: Daniel Bosnjak, Seltz (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 111 days.

(21) Appl. No.: 14/421,263

(22) PCT Filed: Aug. 9, 2013

(86) PCT No.: PCT/DE2013/200112
§ 371 (c)(1),
(2) Date: Feb. 12, 2015

(87) PCT Pub. No.: WO2014/026686
PCT Pub. Date: Feb. 20, 2014

(65) Prior Publication Data
US 2015/0233429 A1    Aug. 20, 2015

(30) Foreign Application Priority Data

Aug. 16, 2012 (DE) .......................... 10 2012 214 543
Aug. 16, 2012 (DE) .......................... 10 2012 214 548
Aug. 16, 2012 (DE) .......................... 10 2012 214 553
Jun. 20, 2013 (DE) .......................... 10 2013 211 664

(51) Int. Cl.
*F16D 25/12* (2006.01)
*F16D 25/08* (2006.01)

(52) U.S. Cl.
CPC ........... *F16D 25/12* (2013.01); *F16D 25/083* (2013.01)

(58) Field of Classification Search
CPC ...... F16D 25/12; F16D 25/082; F16D 25/083; F16D 2300/12
See application file for complete search history.

(56) References Cited

U.S. PATENT DOCUMENTS

| 5,865,288 A * | 2/1999 | Thomire | F16D 25/087 |
| | | | 192/85.51 |
| 2001/0011626 A1* | 8/2001 | Meyer | F16D 25/083 |
| | | | 192/85.51 |
| 2012/0186934 A1 | 7/2012 | Ota et al. | |

FOREIGN PATENT DOCUMENTS

| CN | 101487500 | 7/2009 |
| CN | 102472338 | 5/2012 |
| DE | 19746538 | 4/1999 |
| DE | 102008004027 | 7/2008 |

(Continued)

*Primary Examiner* — Jacob S Scott
(74) *Attorney, Agent, or Firm* — Volpe and Koenig, P.C.

(57) ABSTRACT

A transport lock for a clutch release system, in particular for a slave cylinder of a motor vehicle, is provided having an axially movable piston and a clutch release bearing that is connected to the piston being arranged concentrically on a housing. In order to lock the piston or the clutch release bearing during transport, a retaining ring which has a collar that extends outwards in a radial direction and which is secured on the housing in an inner cavity of the clutch release bearing is provided. A contact surface of the piston lies against the collar of the retaining ring in such a way that the retaining ring restricts the axial movement of the piston.

10 Claims, 3 Drawing Sheets

(56) References Cited

FOREIGN PATENT DOCUMENTS

DE 102009035913 3/2010
DE 102011081381 3/2012

\* cited by examiner

TRANSPORT LOCK, IN PARTICULAR FOR THE PISTON OF A CLUTCH RELEASE BEARING

BACKGROUND

The invention relates to a transport lock, in particular, for the piston of a clutch release bearing, and is used, for example, in a clutch release system for conventional clutches.

From the publication DE 10 2009 035 913 A1, a transport lock is known for components that can move in the axial direction and are arranged concentrically in a clutch or a transmission of a motor vehicle, especially for a clutch release bearing arranged on the housing of a concentric slave cylinder. Here, a securing element used as a stop for the clutch release bearing that can move in the axial direction can be pushed onto the housing in the axial direction and can be clamped into a securing position with biasing stress. However, vibrations during transport can loosen this cap-like securing element from the housing, possibly creating the risk that the clutch release bearing might slip from the housing of the slave cylinder.

According to a not yet published solution, a transport securing device for clutches is known that is fixed on the inner diameter of the housing or on the guide sleeve. The transport securing device has the task of keeping the clutch release bearing of the slave cylinder in a certain, predefined, axial position until the component is mounted in its as-installed position and has the shape of an open ring that is formed by a disk provided with a hole. The disk is broken on one side by a slot. On the side of the disk opposite the slot, the transport securing device has a narrow point. The transport securing device also has a bead that is directed perpendicular to the surface of the disk and has a shoulder. Due to its geometry, the transport securing device is not suitable for an installation space with limited radial space.

SUMMARY

The object of the invention is to develop a transport securing device for the piston of a clutch release bearing that is functionally reliable, has a simple structural configuration, and can be inserted into a given installation space, wherein the radial installation space is limited.

This objective is met with the characterizing features of the first claim. Advantageous constructions are given in the dependent claims.

A transport securing device for the piston of a slave cylinder or a clutch release bearing of a slave cylinder is provided that is formed in the shape of a retaining ring that has, in the direction toward the piston, a stop surface extended in the radial direction and is fixed in the axial direction on the piston in an inner hollow space of the clutch release bearing. For this purpose, an axial securing device of the retaining ring is provided by snap hooks on the retaining ring and complementary recesses in the housing of the clutch release bearing (clutch release housing), so that this cannot detach from the housing in the axial direction.

The snap hooks thus also limit the piston stop on the housing, which prevents the piston and the clutch release bearing from sliding out. The retaining ring has an essentially cylindrical section whose inner peripheral surface is centered on an outer, peripheral-side housing surface. The snap hooks engage in the corresponding installation space of the housing. In the as-installed state, the snap hooks are free.

To create the contact between the piston and the retaining ring and thus to guarantee that the piston or clutch release bearing is fixed in the axial direction during transport, a spring is used that pushes the piston against the retaining ring and thus the retaining ring with its snap hooks against an axial stop surface of the recess. Due to axial end surfaces of the snap hooks that come into contact with the axial stop surface, the movement of the piston and thus of the clutch release bearing is limited.

The contact between the collar of the retaining ring and the piston stop surface must be guaranteed to ensure transport safety. The collar has, however, only a very small radial extent pointing outwards.

For a cleaner installation, the snap hooks are provided on their inner sides with slightly cylindrical surfaces. Thus, no sharp edges are formed. These surfaces prevent chips from being created in the housing during installation. The retaining ring is advantageously formed from sheet steel. For cost reasons, however, it could also be made from plastic.

The snap hooks are formed, especially for the production of the retaining ring from sheet steel, in the form of recessed areas pointing inward in the radial direction from the essentially cylindrical area of the retaining ring.

The retaining ring is thus formed, in particular, from an essentially cylindrical tube section that has, on one end, a collar pointing outward in the radial direction and is provided, at the other end, with snap hooks that point inward in the radial direction and have been preferably formed by recessed areas in the tube section.

The field of use for the invention is transport safety for a clutch release system for conventional clutches, with this clutch release system being used for the hydraulic actuation of clutches.

Through the solution according to the invention, for securing the clutch release bearing or piston of a slave cylinder during transport, a retaining ring with small radial extent is provided that has a stop surface extended in the radial direction and can be arranged in an inner hollow space of the clutch release bearing, wherein the retaining ring is secured by means of snap hooks pointing inward in the radial direction and complementary recesses in the clutch release housing.

BRIEF DESCRIPTION OF THE DRAWINGS

The invention is explained in more detail below using an embodiment and associated drawings.

Shown are.

DETAILED DESCRIPTION OF THE PREFERRED EMBODIMENTS

Figure 1:
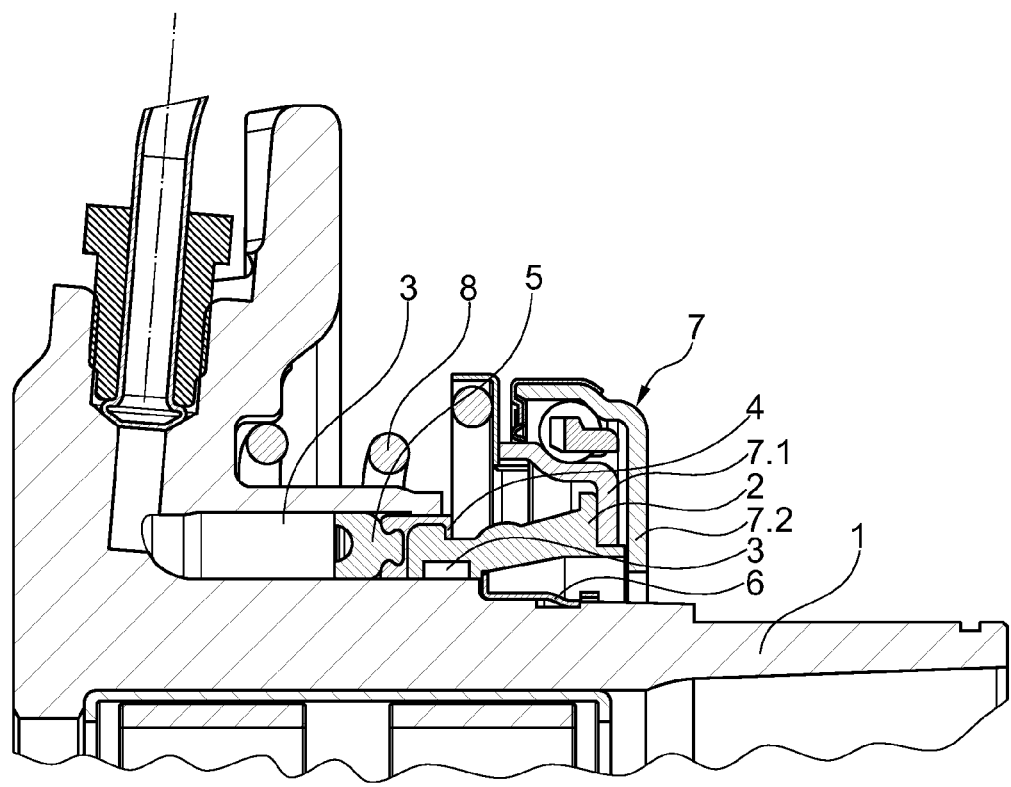
FIG. 1 the retaining ring 6 in the installed state.

In FIG. 1, a partial longitudinal section of a slave cylinder is shown that has a housing 1 with a peripheral-side housing surface 1.1 on which the piston 2 is arranged concentrically and can move in the axial direction. On one end of the piston 2, a seal 5 with the seal holder 4 is attached that forms a seal between the housing 1 and piston 2 in a ring groove 3 of the housing 1. The clutch release bearing 7 attaches to the other end of the piston 2. With the help of a spring 8 that is supported on a not-drawn flange of the housing 1 pointing outward in the radial direction and via the clutch release bearing 7 (via its inner ring 7.1) on the piston 2, the piston 2 is pressed onto a retaining ring 6 that is fixed on the housing in the axial direction. The inner ring 7.1 of the clutch release bearing 7 is fixed on the end of the piston 2 facing away from the seal 5.

Figure 2:
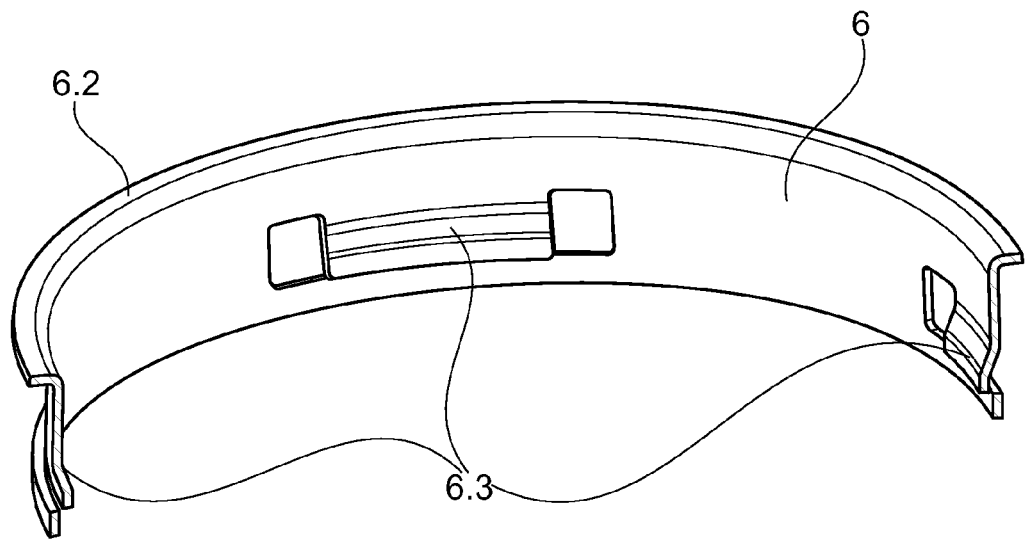
FIG. 2 the three-dimensional representation of half of the retaining ring 6.
Figure 3:
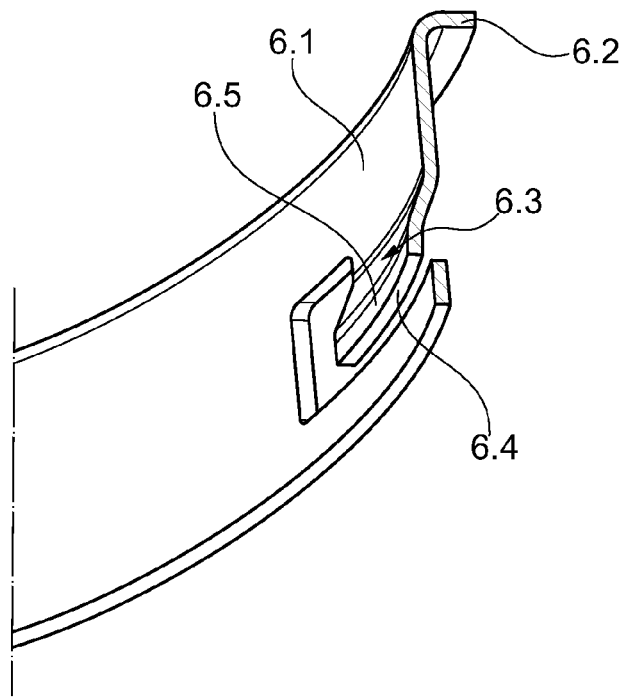
FIG. 3 the three-dimensional representation of the region of a snap hook 6.3 of a retaining ring 6, and FIG. 4 a detail view of a slave cylinder secured for transport.

FIG. 2 shows that the retaining ring 6 has four snap hooks 6.3 that are arranged offset from each other at an angle of 90°. The retaining ring 6 is made from sheet metal and formed like a tube section or ring with an essentially cylindrical area 6', wherein one end has been bent outward in the radial direction by approx. 90° and therefore forms a collar 6.2 pointing outward in the radial direction. The snap hooks 6.3 are formed by recessed areas pointing inward in the radial direction in the cylindrical area 6' and have, according to FIG. 3 on their ends pointing away from collar 6.2, axial end surfaces 6.4 that limit the movement of the piston 2. The snap hooks 6.3 have a cylindrical surface 6.5 pointing inward, in order not to generate any chips due to installation of the retaining ring 6 in the housing 1.

Figure 4:
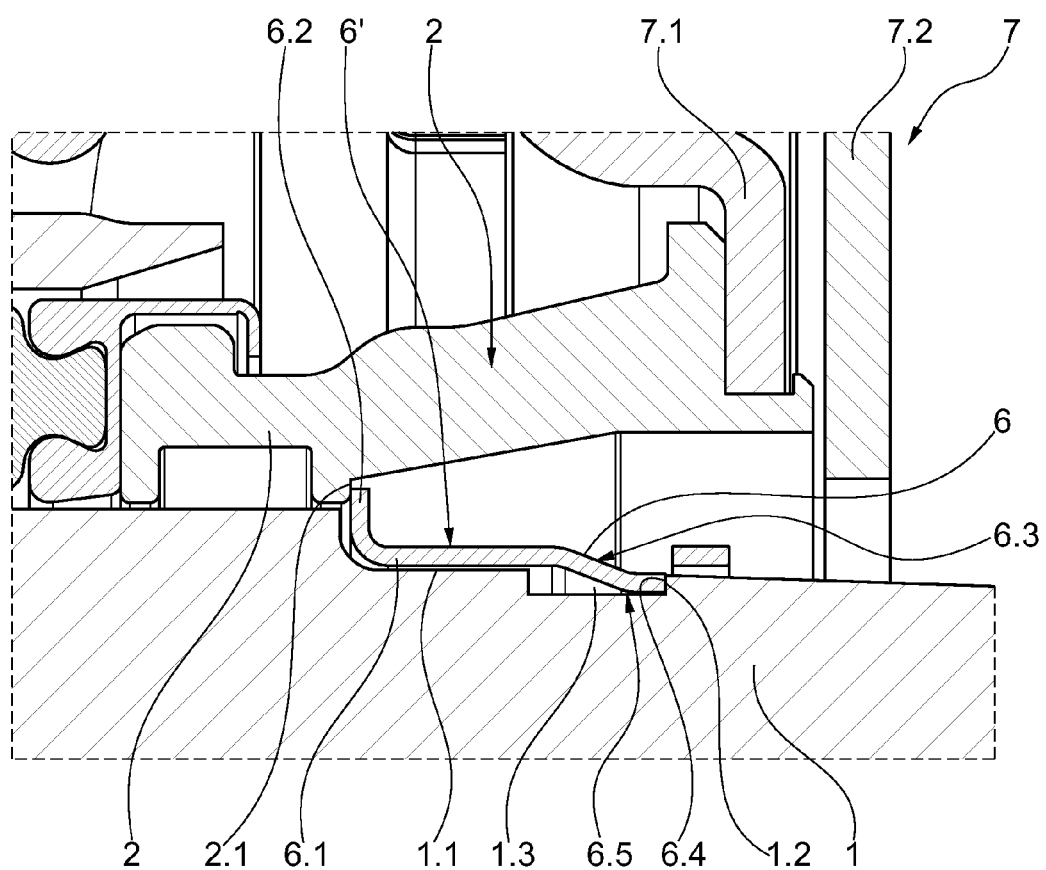

FIG. 4 shows a detail drawing of the installed transport securing device of the slave cylinder in the form of the retaining ring 6 that engages with its snap hooks 6.3 in a recess 1.3 of the housing 1. The recess 1.3 is formed in the shape of a peripheral groove and has a stop surface 1.2 that contacts the axial end surfaces 6.4 of the snap hooks 6 due to the biasing force of the spring 8 (see FIG. 1), because the spring 8 (FIG. 1) presses the piston 2 with its contact surface 2.1 against the collar 6.2 of the retaining ring 6 and this in the axial direction with the snap hooks 6.3 against the stop surface 1.2 of the recess 1.3 in the piston 1.

Therefore, the piston 2 is secured against an axial displacement on the housing 1 during transport. Because the inner ring 7.1 of the clutch release bearing 7 connects to the piston 2, this is also secured in the axial direction together with the piston 2. The retaining ring 6 does not contact the peripheral-side housing surface 1.1 with its inner peripheral surface 6.1, but is spaced somewhat apart from it. The centering of the retaining ring 6 on the housing 1 is here realized by means of the snap hooks 6.3.

According to a not shown embodiment, it is also possible to form the snap hooks on the end of the retaining ring 6 opposite the collar through catch elements bent inward on the ends or through other means.

The retaining ring 6 is fixed on the housing 1 in the inner hollow space of the clutch release bearing 7 and in the inner space of the piston (that is formed as a ring piston) and is spaced apart from the piston in the fastening area of the retaining ring. The retaining ring 6 is installed by an intermediate space between the inner diameter of the outer ring 7.2 and the outer diameter of the housing 1.

For the removal of the retaining ring 6, the snap hooks 6.3 are simply bent outward.

LIST OF REFERENCE NUMBERS

1 Housing
1.1 Outer peripheral-side housing surface
1.2 Stop surface
1.3 Recess in the housing
2 Piston
2.1 Contact surface
3 Ring groove
4 Seal receptacle
5 Seal
6 Retaining ring
6' Cylindrical area of the retaining ring
6.1 Inner peripheral surface of the retaining ring
6.2 Collar
6.3 Snap hook
6.4 Axial end surface
6.5 Cylindrical surface
7 Clutch release bearing
7.1 Inner ring
7.2 Outer ring
8 Spring

The invention claimed is:

1. A transport lock for a clutch release system of a motor vehicle, the clutch release system including a piston that is movable in an axial direction and a clutch release bearing connected to the piston arranged concentrically on a housing, the transport lock comprising a retaining ring that has a collar extending outward in a radial direction mounted on the housing in an inner hollow space of the clutch release bearing, and a contact surface of the piston contacts the collar of the retaining ring, such that the retaining ring limits axial movement of the piston, wherein the retaining ring is fixed on the housing by snap hooks and a complementary recess, wherein an inner peripheral surface of a cylindrical area of the retaining ring is positioned on an outer peripheral-side housing surface of the housing, and the inner peripheral surface extends axially between the collar and the snap hooks.

2. The transport lock according to claim 1, wherein with an end thereof pointing away from the collar, the snap hook contacts a stop surface in the recess, with said stop surface limiting the movement of the piston.

3. The transport lock according to claim 1, wherein the snap hooks are axially between the collar and an opposite end portion of the retaining ring, and the snap hooks are free from contact with the opposite end portion in an as-installed state.

4. The transport lock according to claim 1, wherein the snap hooks have axial end surfaces that limit the movement of the piston when they come into contact with a stop surface of the complementary recess.

5. The transport lock according to claim 1, further comprising a spring that pushes the piston onto the retaining ring and with axial end surfaces of the snap hooks, the retaining ring acts against a stop surface of the complementary recess, and the spring is supported between the housing and clutch release bearing.

6. The transport lock according to claim 5, wherein the snap hooks have, in a direction toward the axial end surfaces, a cylindrical surface.

7. The transport lock according to claim 1, wherein the retaining ring is made from metal or plastic.

8. The transport lock according to claim 1, wherein the snap hooks are formed in a shape of recessed areas that point inward and are formed out of a cylindrical area of the retaining ring.

9. The transport lock according to claim 1, wherein the inner peripheral surface of the cylindrical area of the retaining ring is spaced from the outer peripheral-side housing surface.

10. The transport lock according to claim 1, wherein the retaining ring is positioned radially between the outer peripheral-side housing surface of the housing and an inner peripheral-side surface of the piston which defines a space in which the entire retaining ring is located.

* * * * *